(12) United States Patent
Morimoto et al.

(10) Patent No.: US 8,376,349 B2
(45) Date of Patent: Feb. 19, 2013

(54) DOCUMENT FEEDER, IMAGE READER, AND IMAGE FORMING APPARATUS

(75) Inventors: Yasumasa Morimoto, Osaka (JP); Hiroshi Nakatani, Osaka (JP); Masato Tamehira, Osaka (JP); Sohichi Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/158,557

(22) Filed: Jun. 13, 2011

(65) Prior Publication Data

US 2011/0304094 A1    Dec. 15, 2011

(30) Foreign Application Priority Data

Jun. 14, 2010    (JP) ................................ 2010-135490

(51) Int. Cl.
*B65H 5/22*    (2006.01)
(52) U.S. Cl. .......................... 271/4.03; 271/4.1; 271/117
(58) Field of Classification Search ................ 271/4.03, 271/4.1, 10.03, 10.11, 117, 118
See application file for complete search history.

(56) References Cited

U.S. PATENT DOCUMENTS

| 4,436,298 A * | 3/1984 | Donner et al. ............. 271/10.12 |
| 7,256,389 B2 * | 8/2007 | Prasad ....................... 250/223 B |
| 8,011,651 B2 * | 9/2011 | Morita et al. .............. 271/10.03 |

FOREIGN PATENT DOCUMENTS

| JP | 60-242762 A | 12/1985 |
| JP | 2002-193494 A | 7/2002 |
| JP | 2007-302356 A | 11/2007 |

* cited by examiner

*Primary Examiner* — Michael McCullough
(74) *Attorney, Agent, or Firm* — Birch, Stewart, Kolasch & Birch, LLP (57) ABSTRACT

A document feeder includes a document placing portion, a pick-up roller, a pair of feed rollers, a pair of registration rollers, a document sensor, a moving mechanism, and a control portion. The pick-up roller can move between a sheet feeding position where the pick-up roller contacts with the upper surface of the document placed on a placement surface and a standby position where the pick-up roller does not contact with the upper surface of the document placed on the placement surface. The document sensor detects a document between the feed rollers and the registration rollers in a document feed direction. The moving mechanism moves the pick-up roller up and down. The control portion moves the pick-up roller up to the standby position at a timing when the leading edge of the card document reaches the document sensor in a card document mode in which card documents are successively fed.

10 Claims, 10 Drawing Sheets

DOCUMENT FEEDER, IMAGE READER, AND IMAGE FORMING APPARATUS

CROSS REFERENCE

This Nonprovisional application claims priority under 35 U.S.C. §119(a) on Patent Application No. 2010-135490 filed in Japan on Jun. 14, 2010, the entire contents of which are hereby incorporated by reference.

BACKGROUND OF THE INVENTION

1. Field of the Invention

The present invention relates to a document feeder for feeding documents one by one from a document placing portion to a document receiving portion via an image reading position, and more specifically to a document feeder for feeding not only paper documents having high flexibility but also small-sized card documents having low flexibility. The present invention also relates to an image reader and an image forming apparatus provided with such a document feeder.

2. Description of the Related Art

As a scanner for reading an image of a document, a document feeder for feeding documents one by one from a document placing portion to a document receiving portion via an image reading position is used. Such a document feeder as disclosed in Japanese Patent Laid-Open Publication No. 60-242762, for example, includes a freely movable pick-up roller in the upper part of an end portion on the downstream side of the document placing portion in a document feed direction, and a pair of feed rollers and a pair of conveyance roller (hereinafter referred to as a pair of registration rollers, as the case may be) between the pick-up roller and the document reading position.

The pick-up roller moves down to a sheet feeding position where the roller contacts with the upper surface of a document placed on a document platen while rotating in synchronization with the pair of feed rollers at start of feeding a document. The pair of feed rollers rotates while vertically holding the document therebetween. The pair of conveyance rollers starts rotating after a lapse of predetermined time from a time when the leading edge of the document reaches a document sensor disposed on the upstream side of the pair of conveyance rollers.

The document placed on the document platen is fed toward the pair of feed rollers by the rotation of the pick-up roller, and then guided to the pair of conveyance rollers by the rotation of the pair of feed rollers. The above-stated predetermined time is a time longer than the time required for the leading edge of a document sheet to reach the pair of conveyance rollers after having passed the document sensor. The fed position of the document is corrected by contacting with the leading edge thereof with the pair of conveyance rollers before the rollers start rotation.

The document feeder has a space for stacking and placing a plurality of documents above the document platen so that images on the plurality of documents are successively read. The pick-up roller moves up to a standby position which does not contact with the upper surface of the document placed on the document platen before starting feeding a document. After moving down to the sheet feeding position at the start of feeding a document, the pick-up roller moves up to the standby position when the leading edge of the document reaches the position of the document sensor.

Images on a plurality of documents being successively read, the pick-up roller moves up to the standby position every time when the leading edge of each document reaches the document sensor, and moves down to the sheet feeding position before feeding the following document. Such movement of the pick-up roller makes a larger feeding interval between documents, and lengthens operating time for feeding a plurality of documents.

In an attempt to overcome such problems, some conventional document feeders, in successively feeding a plurality of documents, cause a pick-up roller to move down to a sheet feeding position before starting feeding the first document, and cause the pick-up roller to move up to a standby position when the leading edge of the last document reaches a document sensor. A smaller feeding interval between documents can shorten time for feeding a plurality of documents.

In order to correctly read an image of a document in an image reading position, a document feed path between a feed roller and a document reading position is formed in a straight line, so that the nip portion of a pair of registration rollers is located on a line tangent to the nip portion of a pair of feed rollers. The placement surface of a document placing portion is located below a straight line connecting the feed rollers and the image reading position, and the end portion of the downstream side of the placement surface is composed of an inclined surface where the downstream side in the feed direction is located above the upstream side.

In the conventional document feeders, the pick-up roller also moves up and down in feeding a small-sized card document having low flexibility at the same timing as in feeding a paper document having high flexibility. In feeding a plurality of card documents placed on the document placing portion one by one, the pick-up roller keeps pressing the card document downward in a sheet feeding position until the leading edge of the last card document reaches a sensor position. The card documents other than the last card document are not guided between the pair of registration rollers because the leading edge located on the downstream side of the pair of feed rollers moves upward by being pressed downward on the upstream side of the pair of feed rollers.

An object of the present invention is to provide a document feeder capable of surely guiding the leading edge of a card document between a pair of registration rollers by causing a pick-up roller to move up to a standby position when the card document is conveyed at a timing different from when a paper document is conveyed, and an image reader and an image forming apparatus provided with the document feeder.

SUMMARY OF THE INVENTION

A document feeder according to the present invention includes a document placing portion, a pick-up roller, a pair of feed rollers, a pair of registration rollers, a document sensor, a moving mechanism, and a control portion. The document placing portion places a document on a placement surface. The pick-up roller can move up and down between a sheet feeding position which contacts with the upper surface of the document placed on the placement surface and the standby position which does not contact with the upper surface of the document placed on the placement surface. The pair of feed rollers and the pair of registration rollers are disposed at the downstream side of the pick-up roller in a document feed direction. The document sensor detects a document between the pair of feed rollers and the pair of registration rollers in the document feed direction. The moving mechanism causes the pick-up roller to move up and down. The control portion controls the moving mechanism so that the pick-up roller is in a standby position at any time the document sensor detects a card document in a card document mode in which a plurality of card documents are successively fed.

DETAILED DESCRIPTION OF THE INVENTION

Hereinafter, an image forming apparatus provided with a document feeder according to an embodiment of the present invention is exemplified and described.

Figure 1:
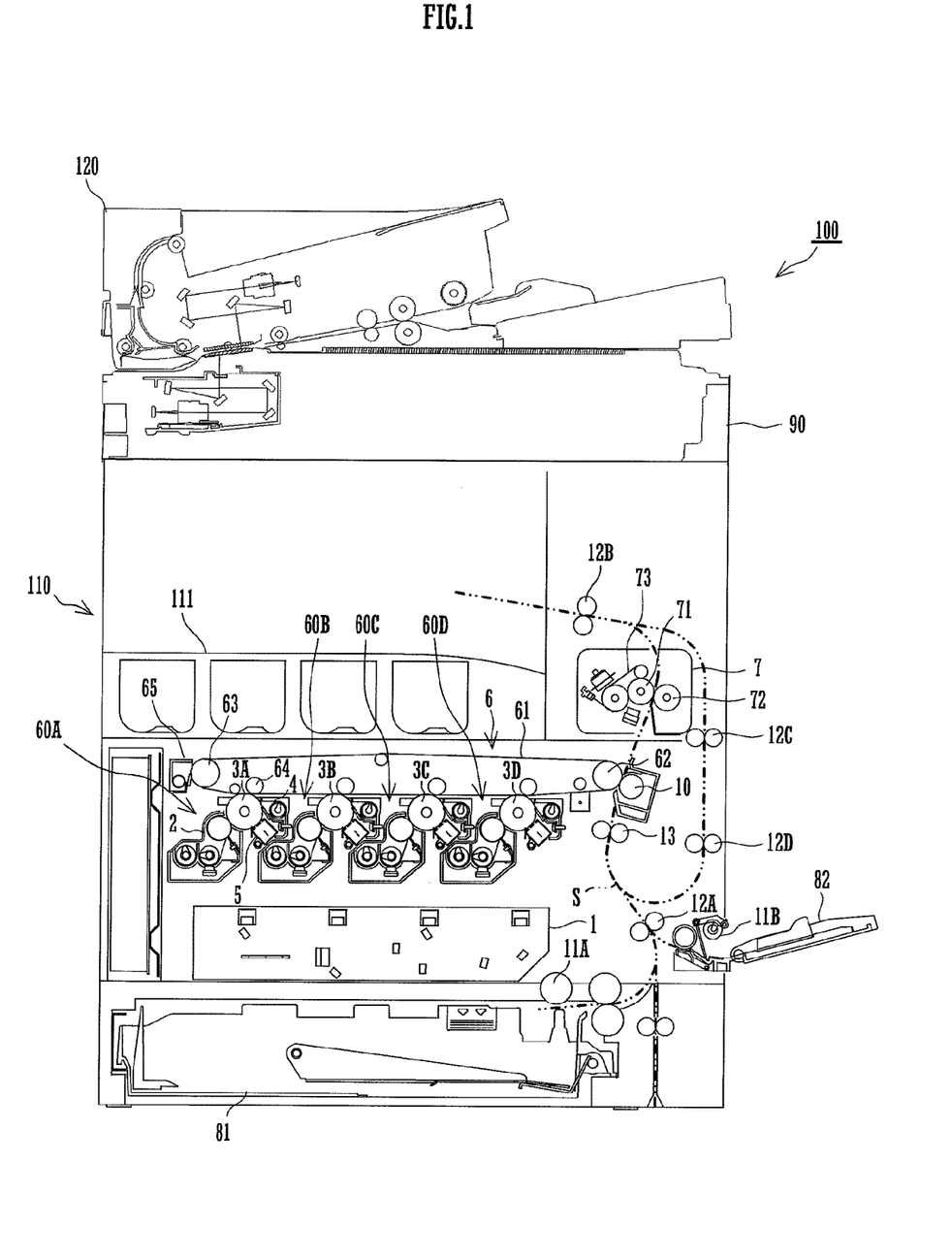
FIG. 1 is a schematic diagram of an image forming apparatus provided with a document feeder according to an embodiment of the present invention.

As illustrated in FIG. 1, an image forming apparatus 100 provided with a document feeder 120 according to an embodiment of the present invention forms a multi-colored and single-colored image onto a predetermined sheet (a recording sheet) on the basis of image data. An image reading portion 90 is disposed on the upper part of an apparatus main body 110. The document feeder 129 is attached to the upper side of the image reading portion 90. The document feeder 120 automatically feeds a document. The document feeder 120 is pivotally supported at a rear-side end portion thereof, so that the top surface of the image reading portion 90 can be freely opened and closed.

The apparatus main body 110 includes image forming portions 60A to 60D, an optical scanner 1, an intermediate transfer belt unit 6, a fixing unit 7, a sheet feeding cassette 81, a copy receiving tray 111 and the like. The image forming portions 60A to 60D form toner images corresponding to respective hues of yellow, magenta, cyan, and black. The image forming portion 60A includes a developing device 2, a photoreceptor drum 3A, a cleaner unit 4, and a charger 5. The image forming portions 60B to 60D respectively have the same configuration as the image forming portion 60A.

The charger 5 is means for uniformly charging a surface of the photoreceptor drum 3A to a predetermined potential, and may be a contact-type charger using a roller or a brush besides the charger type as illustrated in FIG. 1.

The optical scanner 1 includes semiconductor lasers corresponding to respective hues of yellow, magenta, cyan, and black, reflection mirrors, and the like, together with a single polygon mirror. The optical scanner 1 deflects the laser beams of respective hues emitted from the semiconductor lasers by the polygon mirror at a constant angular velocity in the main scanning direction, then deflects the laser beams by an f-θ lens at a constant velocity, and guides the beams to the respective photoconductor drums 3A to 3D via the reflection mirrors. The optical scanner 1 may be replaced by a write head having an array of light-emitting devices such as ELs or LEDs, for example.

The image forming portion 60A forms an electrostatic latent image on the surface of the photoreceptor drum 3A by the yellow laser beam emitted from the optical scanner 1. The developing device 2 visualizes an electrostatic latent image formed on the photoreceptor drum 3A with yellow toner. The cleaner unit 4 collects remaining toner on the surface of the photoreceptor drum 3A after a primary transfer to be described later. Toner images of magenta, cyan, and black are formed on the respective photoreceptor drums 3B to 3D in the image forming portions 60B to 60D in the same manner as in the image forming portion 60A.

The intermediate transfer belt unit 6 includes an intermediate transfer belt 61, a drive roller 62, an idle roller 63, and an intermediate transfer roller 64. As for the intermediate transfer roller 64, four rollers are disposed corresponding to respective hues of yellow, magenta, cyan, and black.

The drive roller 62, the idle roller 63, and the intermediate transfer roller 64 stretch the intermediate transfer belt 61 therebetween. By the rotation of the drive roller 62 which receives a rotational force from a non-illustrated drive source, the intermediate transfer belt 61 moves along a loop-shaped moving path passing through the image forming portions 60A to 60D in this order. The intermediate transfer roller 64 primarily transfers the toner images on the surface of the photoreceptor drums 3A to 3D on to the intermediate transfer belt 61 by a transfer bias applied from a non-illustrated power supply portion.

In full color image formation, the toner images on the surfaces of the photoconductor drums 3A to 3D are sequentially transferred to the intermediate transfer belt 61 in an overlaying manner, so that a color image is formed on the intermediate transfer belt 61 by subtractive primary colors.

The toner images transferred by the intermediate transfer belt 61 are guided to between the drive roller 62 and a secondary transfer roller 10 by the rotation of the intermediate transfer belt 61, and is secondarily transferred on a sheet by the secondary transfer roller 10. After the secondary transfer, the toner remaining on the intermediate transfer belt 61 is removed by the cleaning unit 65.

The sheet feeding cassette 81 is disposed below the optical scanner 1, and stores sheets (recording sheets) which are used for image formation. The manual feed tray 82 is freely rotatably disposed on one side face of the apparatus main body 110, and places thereon sheets which are used for the image formation. The copy receiving tray 111 is disposed above the image forming portions 60A to 60D, and stores image-formed sheets.

The apparatus main body 110 forms therein a sheet feed path S from the sheet feed cassette 81 and the manual feed tray 82 to the copy receiving tray 91 by passing between the intermediate transfer belt 62 and the transfer roller 10 and through the inside of the fixing unit 7. Along the sheet feed path S, pick-up rollers 11A and 11B, conveyance rollers 12A to 12D, a registration roller 13, and the secondary transfer roller 10 are disposed.

The pick-up rollers 11A and 11B are disposed near the sheet feeding cassette 81 and the manual feed tray 82, respectively, and feed a sheet one by one from the sheet feeding cassette 81 and the manual feed tray 82 to the sheet feed path S. The registration roller 13 temporarily holds the sheet conveyed along the sheet feed path S, and starts rotating at a timing when the leading edge of the sheet matches the leading edge of the toner image on the intermediate transfer belt 62 between the intermediate transfer belt 62 and the secondary transfer roller 10.

The fixing unit 7 includes a heat roller 71 and a pressure roller 72. The heat roller 71 and the pressure roller 72 heat and press the sheet on which the toner image is secondarily transferred, and fix the toner image to the sheet.

Figure 2:
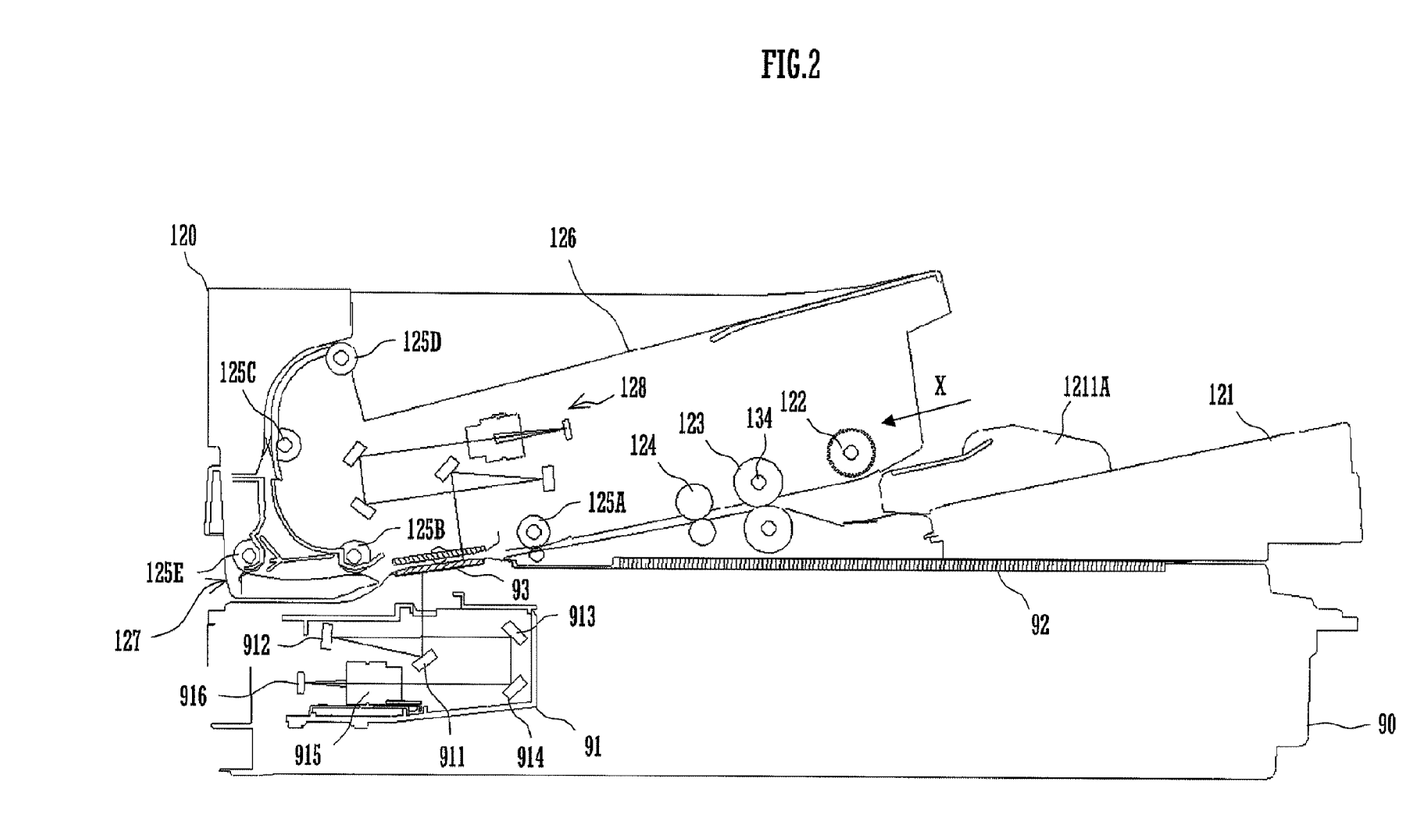
FIG. 2 is a sectional view schematically illustrating the document feeder and an image reading portion.

As illustrated in FIG. 2, the image reader 90 includes document platens 92 and 93 on an upper surface thereof, and includes a scanning unit 91 therein. The scanning unit 91 includes mirrors 911 to 914, a lens 915, and a CCD 916, and is made movable back and forth in parallel to the document platens 92 and 93 under the document platens 92 and 93. The scanning unit 91 reads an image of a document manually placed on the document platen 92 while moving under the document platen 92. The scanning unit 91 also reads an image of a document fed by the document feeder 120 while resting under the document platen 93.

The document feeder 120 includes a document placing tray 121, a pick-up roller 122, a pair of feed rollers 123, a pair of registration rollers 124, conveyance rollers 125A to 125E, a document receiving tray 126, and an image reading unit 128. The document feeder 120 feeds not only highly flexible paper documents but also low flexible card documents. The card documents include plastic cards such as IC cards and card-shaped documents such as driver's licenses, for example.

The document placing tray 121 corresponds to a document placing portion of the present invention and is designed to allow a plurality of documents to be placed thereon. The document placing tray 121 includes a document guide 1211A and a non-illustrated document guide 1211B which define the position where a document is to be placed. The end portion on the downstream side in the feed direction of the document placing tray 121 is composed of an inclined surface inclined upward to the downstream side.

The pick-up roller 122 is freely movably disposed above the end portion on the downstream side of the document placing tray 121. The pick-up roller 122 contacts with the upper surface of documents placed on the document placing tray 121 in a lower sheet feeding position, and feeds out the documents one by one toward the pair of feed rollers 123 by a rotation thereof.

Figure 3A:
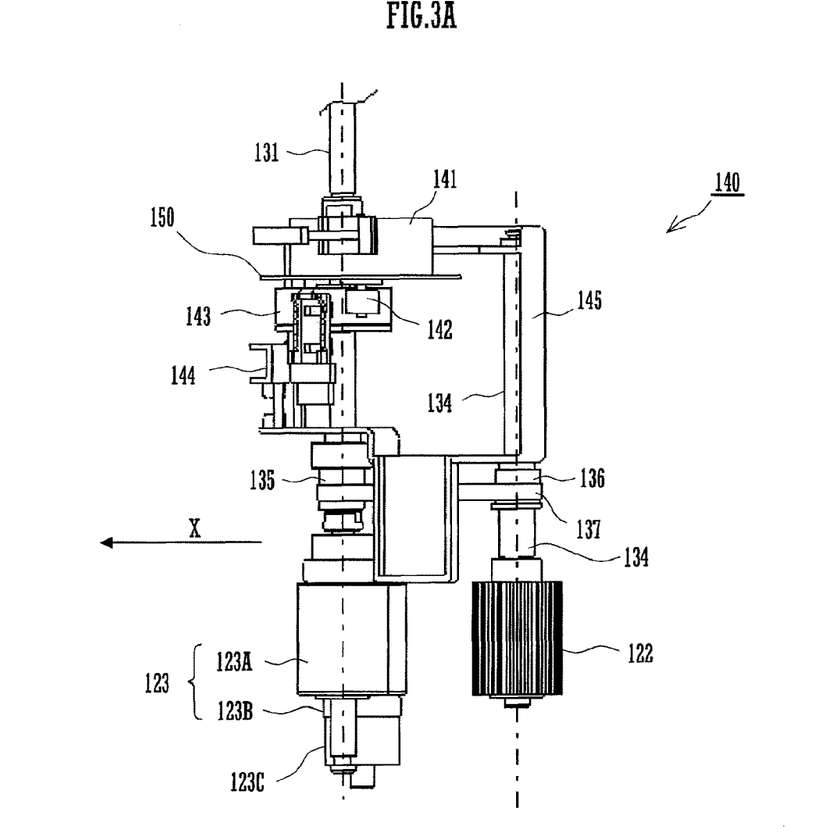
FIGS. 3A and 3B are a plan view and a side elevation view of a moving mechanism of the document feeder.
Figure 3B:
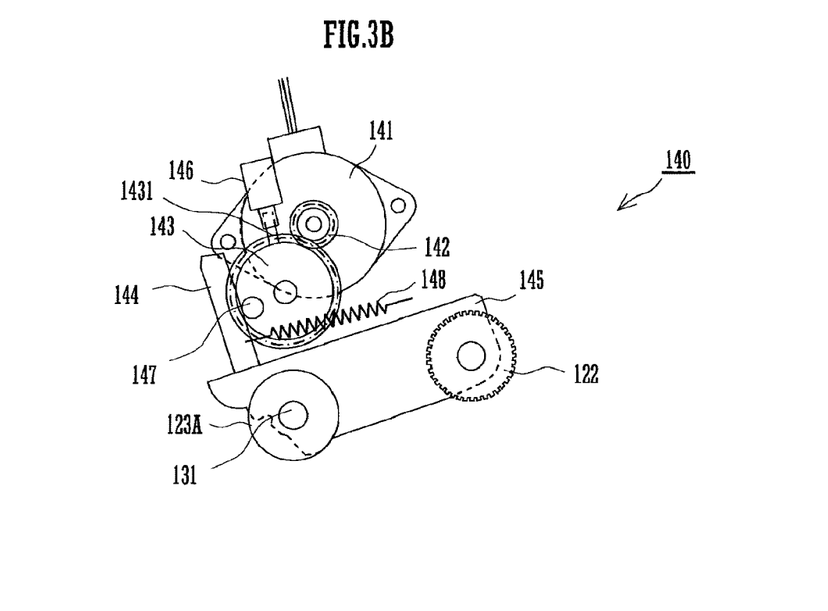

As illustrated in FIGS. 1, 3A, and 3B, the pair of feed rollers 123 and the pair of registration rollers 124 are disposed in this order on the downstream side of the pick-up roller 122 in the feed direction. The pair of feed rollers 123 holds the document fed out by the pick-up roller 122 between nips, and guides the document to the pair of registration rollers 124 by a rotation thereof. The pair of registration rollers 124 starts rotating at a timing when the leading edge of the document reaches the rollers after a lapse of a predetermined time, holds the document in a nip in a state where the fed position of the document is corrected, and guides the document to the document platen 93 by the rotation thereof.

The conveyance rollers 125A to 125D feed a paper document which passes through the upper surface of the document platen 93 to the document receiving tray 126. The conveyance roller 125E guides a card document which passes though the upper surface of the document platen 93 to an output port 127.

The image reading unit 128 selectively reads an image on a second face of a sheet whose image on a first face is read by the scanning unit 91 while passing through the document platen 93. Thus, the document feeder 120 can read an image on both sides of the document while feeding the document once from the document placing tray 121 to the document receiving tray 126.

The document feeder 120 includes a moving mechanism 140 illustrated in FIGS. 3A and 3B. The moving mechanism 140 causes the pick-up roller 122 to move up and down between an upper standby position and a lower sheet feeding position. Therefore, the moving mechanism 140 includes a motor 141, a drive gear 142, an idle gear 143, a rocker arm 144, a support member 145, a photosensor 146, and a spring 148.

The motor 141 fixes the drive gear 142 on an output shaft rotating in both forward and reverse directions, and is fixed to a frame 150 of the document feeder 120. The idle gear 143 engages in the drive gear 142 by being pivotally supported by the frame 150, and includes, on the side face, a boss 147 which projects in the axial direction. The idle gear 143 also includes a convex portion 1431 projected from a part of a peripheral direction to a radial direction. The convex portion 1431 does not interfere with the drive gear 142. In a plane view illustrated in FIG. 3A, the support member 145 is U-shaped, and both ends thereof are pivotally supported by a rotating shaft 131 to which a driving side roller 123A of the pair of feed rollers 123 is fixed. The support member 145 pivotally supports a rotating shaft 134 which fixes the pick-up roller 122 on the side of an intermediate portion. The photosensor 146 detects the convex portion 1431 of the idle gear 143. The rocker arm 144 extends upward from the end portion of the support member 145, and contacts with the peripheral surface of the boss 147 on one side face thereof. The spring 148 has one end engaged in the frame 150, and biases the rocker arm 144 clockwise around the rotating shaft 131.

It is to be noted that the rotation from a non-illustrated motor is transmitted to the rotating shaft 131. The rotation of the rotating shaft 131 is transmitted to a rotating shaft 134 via a belt 137 stretched over pulleys 135 and 136. Thus, the pick-up roller 122 rotates synchronizing with the drive side roller 123A of the pair of feed rollers 123.

In addition, the idle side roller 123B of the pair of feed rollers 123 is pivotally supported via a torque limiter 123C. In a case where a plurality of documents are fed at one time by the pick-up roller 122, the rotation of the idle side roller 123B stops by increase in running torque, and only one document which contacts with the drive side roller 123A passes the pair of feed rollers 123.

Figure 4A:
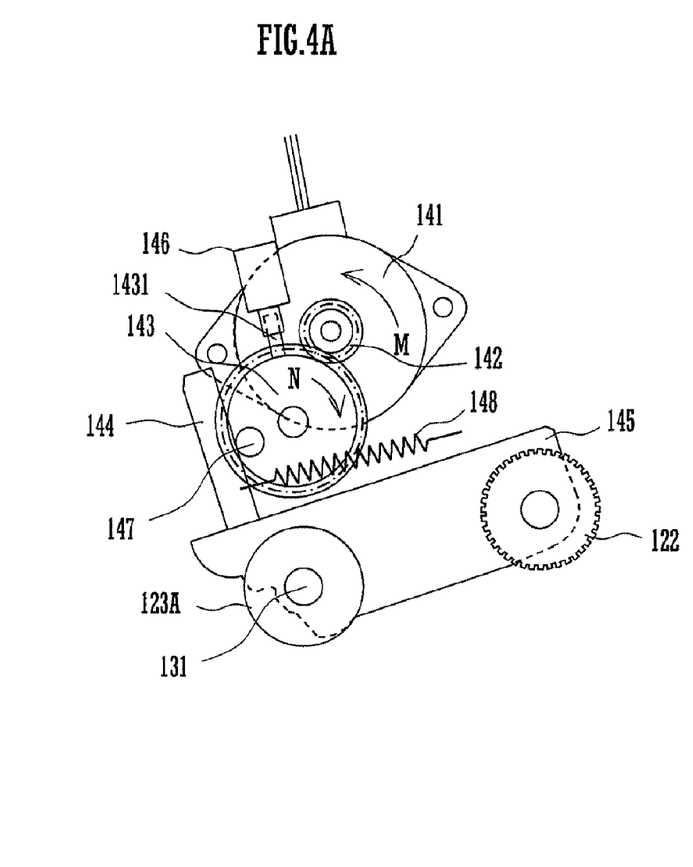
FIGS. 4A and 4B are figures illustrating operation of the moving mechanism.
Figure 4B:
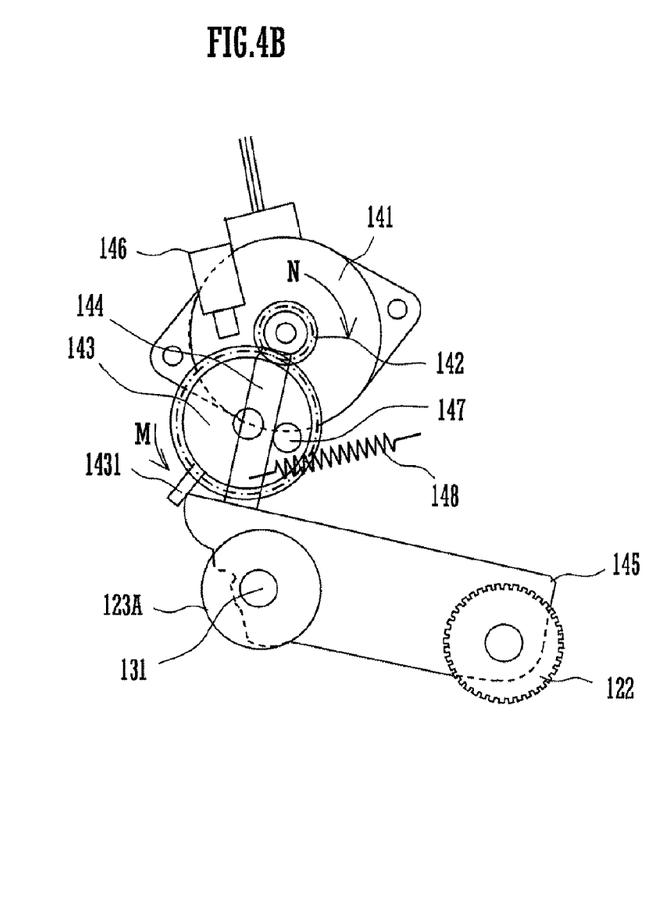

In order to move the pick-up roller 122 located in the standby position shown in FIG. 4A down to the sheet feeding position shown in FIG. 4B, the motor 141 is driven counterclockwise (the direction indicated by arrow M). The idle gear 143 rotates clockwise (the direction indicated by arrow N) and the contact position of the rocker arm 144 and the boss 147 moves, so that the support member 145 swings clockwise around the rotating shaft 131, and the pick-up roller 122 moves down together with the rotating shaft 134. While the pick-up roller 122 is located in the standby position, the photosensor 146 detects the convex portion 1431. The pick-up roller 122 moves down to the sheet feeding position by driving the motor 141 counterclockwise by a predetermined pulse from a time when the photosensor 146 has detected the convex portion 1431.

On the contrary, in order to move the pick-up roller 122 located in the sheet feeding position shown in FIG. 4B up to the standby position shown in FIG. 4A, the motor 141 is driven clockwise (the direction indicated by arrow N). The idle gear 143 rotates counterclockwise (the direction indicated by arrow M), and the contact position of the rocker arm 144 and the boss 147 moves, so that the support member 144 swings counterclockwise around the rotating shaft 131, and the pick-up roller 122 moves up together with the rotating shaft 134. In this case, the motor 141 is driven clockwise until the photosensor 146 detects the convex portion.

The moving mechanism 140 includes the motor 141 for causing the pick-up roller 122 to move up and down in addition to a motor for rotating the pick-up roller 122 and the pair of feed rollers 123. Therefore, the moving mechanism can cause the pick-up roller 122 to move up and down regardless of the rotation state of the pick-up roller 122 in synchronization with the rotation of the pair of feed rollers 123.

Figure 5:
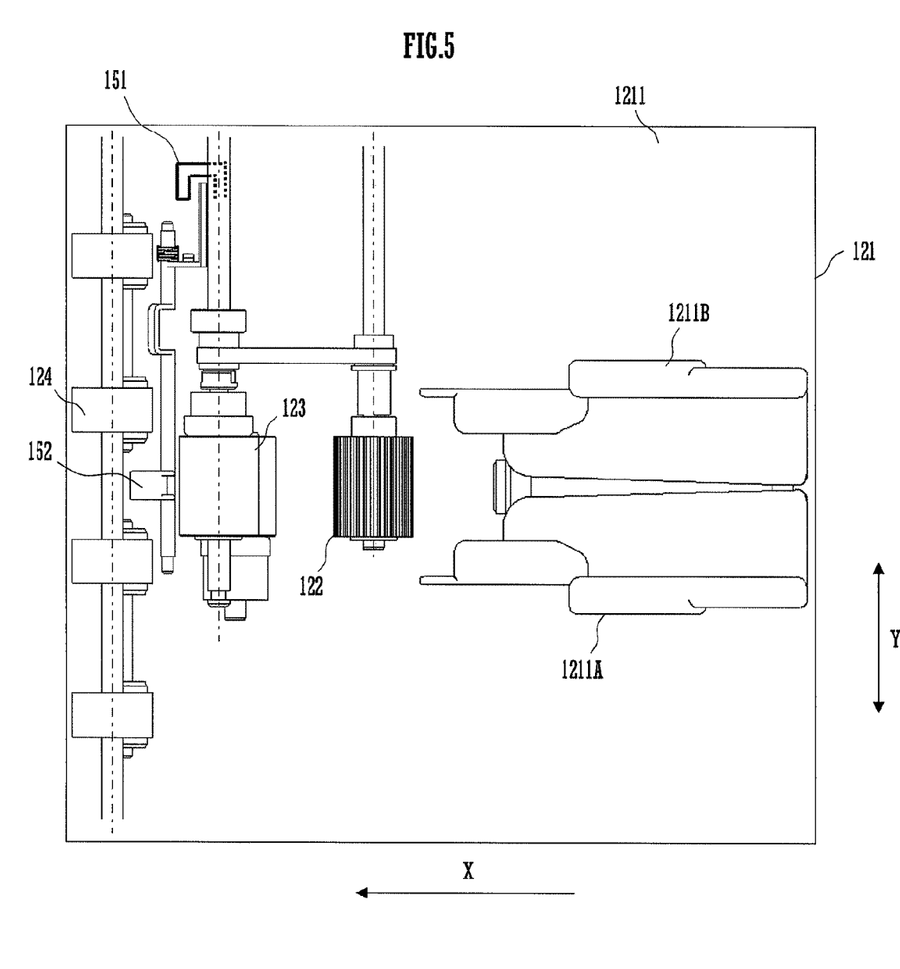
FIG. 5 is a plan view illustrating a neighborhood of a document placing tray of the document feeder.

As shown in FIG. 5, the document feeder 120 pivotally supports an actuator 152 of a document sensor 151 in a state where a part thereof exposes in the middle of the feed path, the actuator being provided between the pair of feed rollers 123 and the pair of registration rollers 124 in the feed direction (the direction indicated by arrow X). The actuator 152 rotates in contact with the leading edge of the document before the edge reaches the pair of registration rollers 124 after passing the pair of feed rollers 123. The document sensor 151 is composed of a photo coupler as an example. The end portion of actuator 152 deviates from a light emitting device and a light receiving device by the rotation of the actuator 152, whereby the document sensor 151 detects that the leading edge of the document reaches a nip between the pair of feed rollers 123 and the pair of registration rollers 124.

The document placing tray 121 includes movable document guides 1211A and 1211B along the direction (the direction indicated by arrow Y) which intersects perpendicularly with the feed direction (the direction indicated by arrow X). The document guides 1211A and 1211B define the position where a document is to be placed by contacting with both side surfaces thereof parallel to the feed direction of the placed document. The positions of the s 1211A and 1211B are detected by a non-illustrated document size sensor. The document size sensor detects the size of the document placed on the document placing tray 121 based on detection result of the positions of the document guides 1211A and 1211B.

As an example, as shown in FIG. 5, the document guides 1211A and 1211B define the position where a card document is to be placed in a state where the guides are closest to each other.

At this time, the document size sensor to be described later detects the size of the card document as a kind of sizes of a document which is placed on the document placing tray 121.

Figure 6:
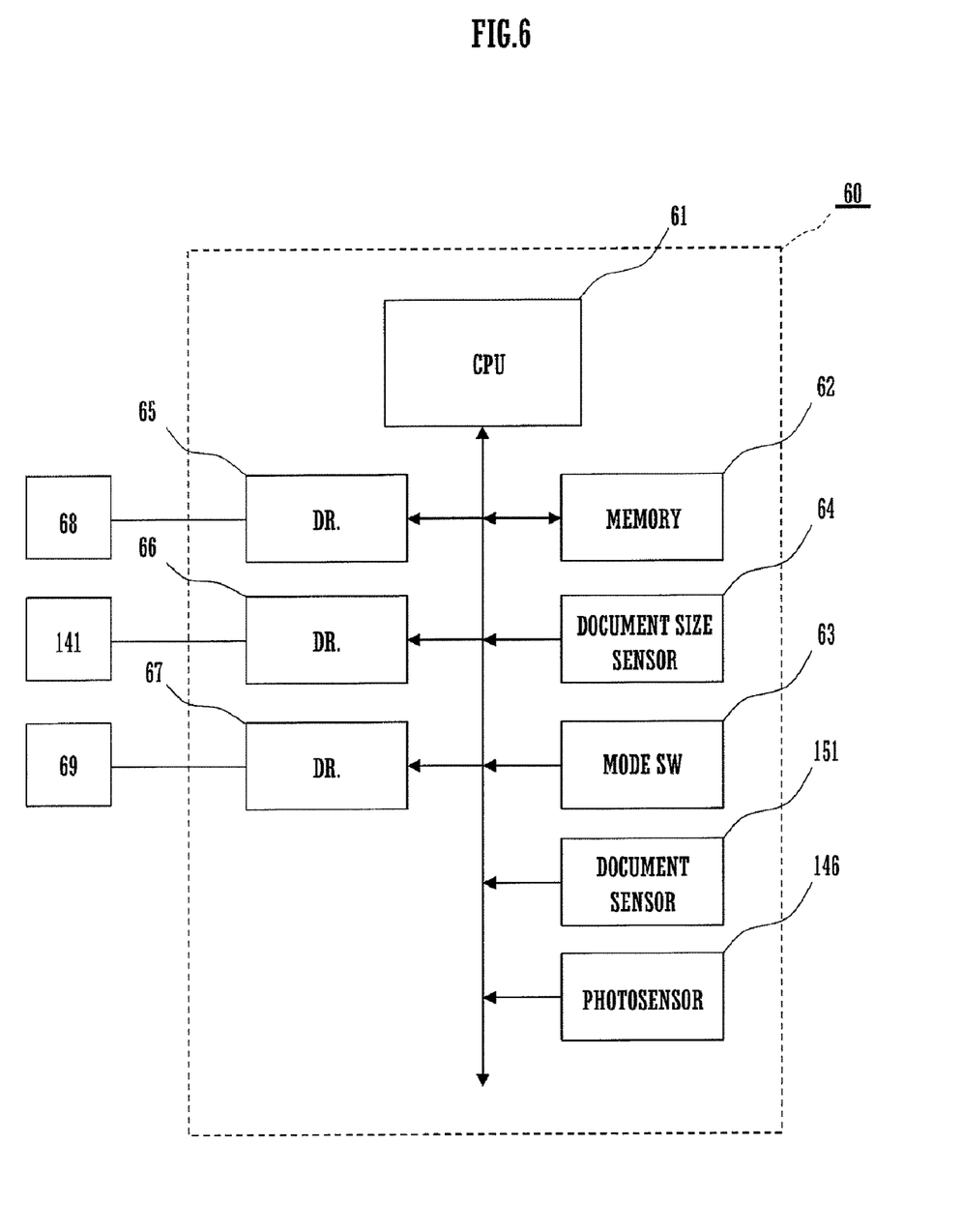
FIG. 6 is a block diagram of a control portion of the document feeder.

The document feeder 120 includes a control portion 60 shown in FIG. 6. The control portion 60 is configured to connect a CPU 61 with a memory 62, a mode switch 63, a document size sensor 64, the photosensor 146, the document sensor 151, and drivers 65 to 67.

The CPU 61 receives the input of operation signals from the mode switch 63 and of detection signals from the document size sensor 64, the photosensor 146, and the document sensor 151. The CPU 61 outputs drive data to the drivers 65 to 67 based on these inputted signals. The drivers 65 to 67 are connected to a motor 68, a motor 141, and a clutch 69, respectively. The motor 68 supplies the rotation thereof to the rotating shaft 131 of the pair of feed rollers 123. The motor 141 causes the pick-up roller 122 to move up and down. The clutch 69 selectively transmits the rotation of the motor 68 to the pair of registration rollers 124.

Figure 7:
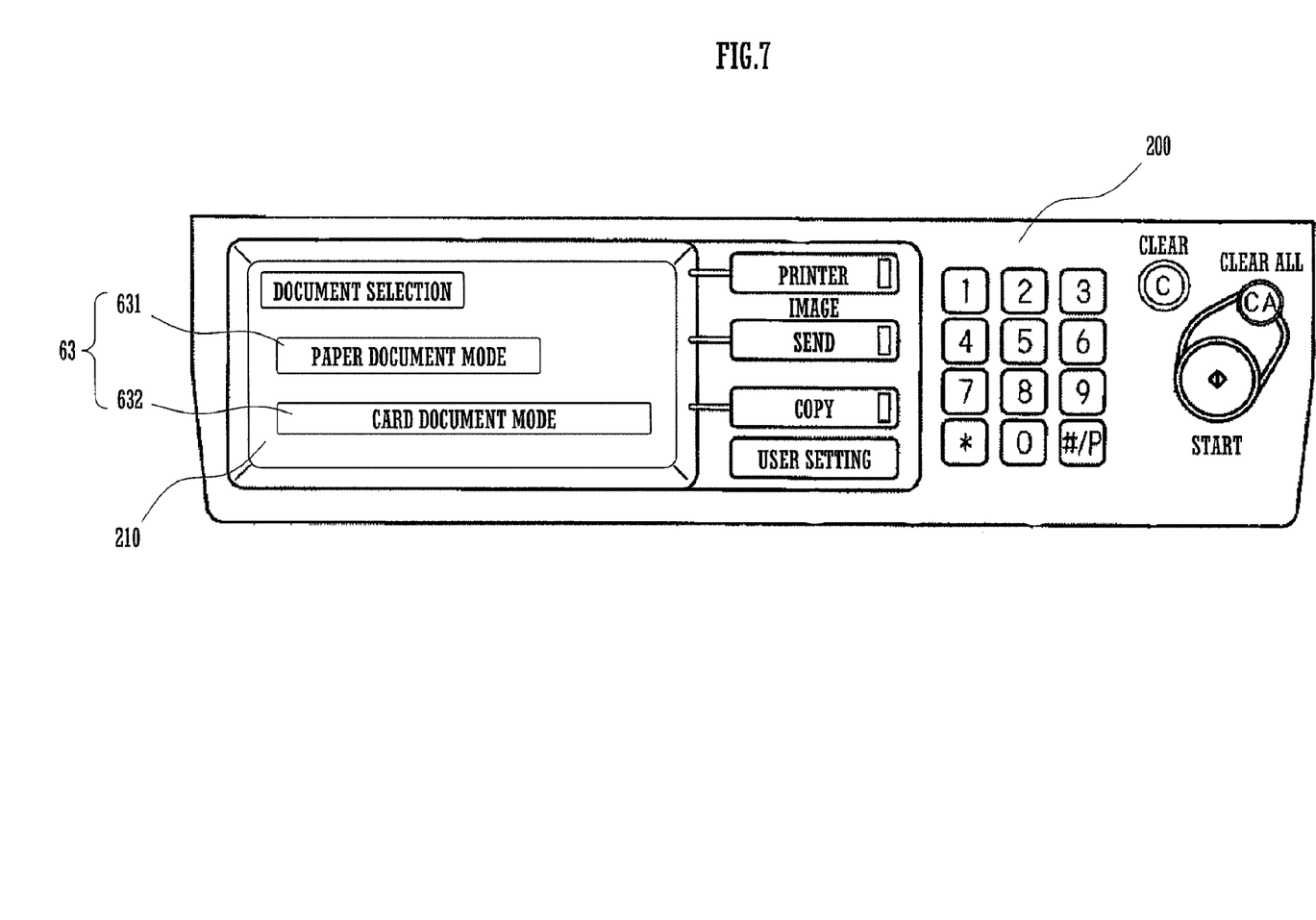
FIG. 7 is a plan view of an operating portion of the image forming apparatus.

The mode switch 63, as shown in FIG. 7 as an example, is displayed on a display 210 of an operation panel 200 of the image forming apparatus 100, and receives a selection input by a pressing operation of a paper document mode switch 631 or a card document mode switch 632. The CPU 61 performs the card document mode when the document size sensor 64 detects a card document size or when an operator presses the card document mode switch 632. The CPU 61 alternatively performs the paper document mode when the document size sensor 64 detects sizes other than the card document size or when an operator presses the paper document mode switch 631.

Furthermore, the document size sensor 64 includes a sensor which detects the positions of the document guides 1211A and 1211B and a sensor which detects the length of a document in the feed direction. The sensor which detects the length of a document in the feed direction is disposed while being exposed to the upper surface of the document placing tray 121, for example.

Figure 8:
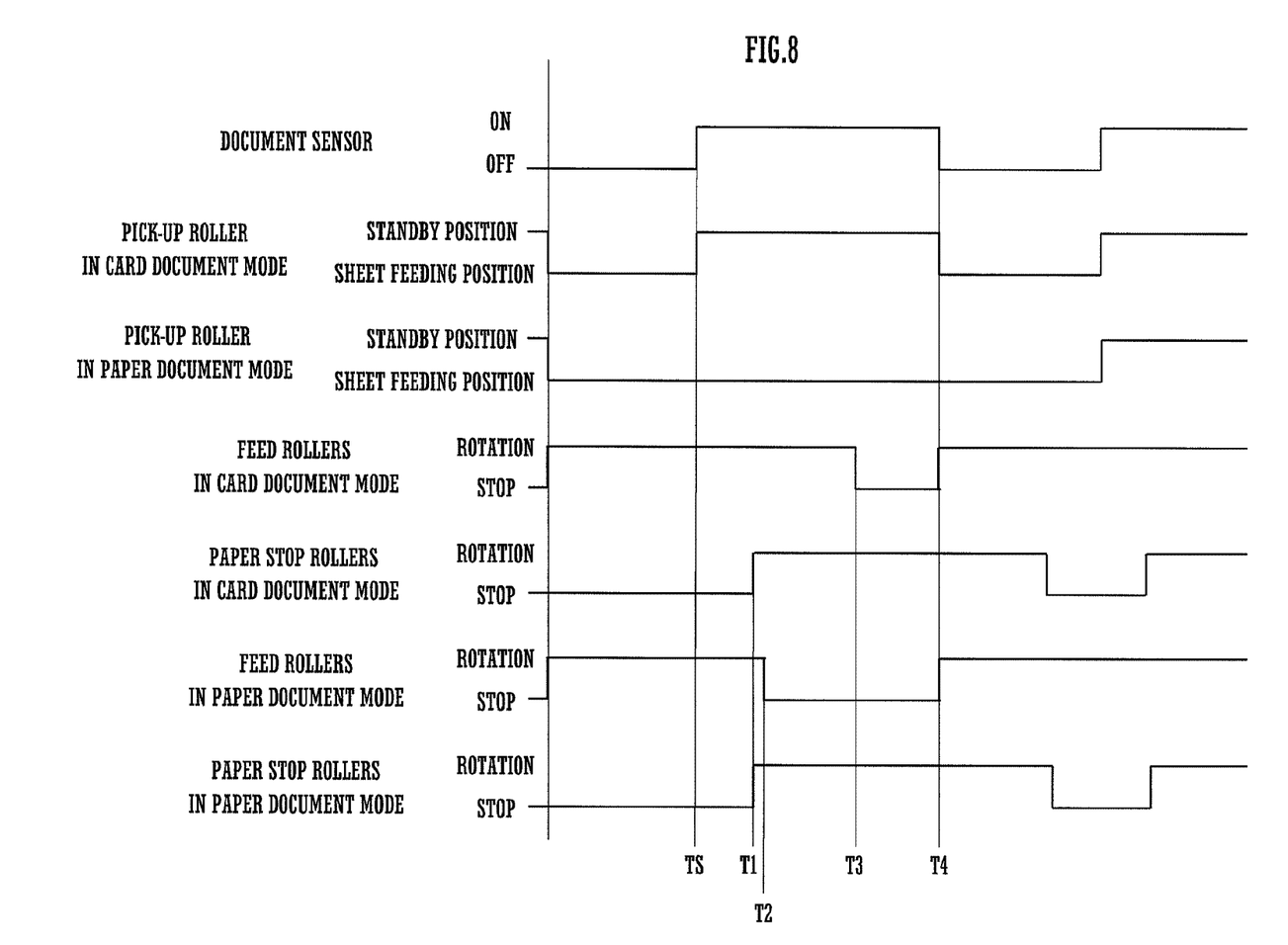
FIG. 8 is a timing chart of an operating state of each component by control of the control portion.

As shown in FIG. 8, in feeding a highly flexible paper document in the paper document mode which successively feeds a plurality of paper documents (two sheets in FIG. 8), the CPU 61 starts driving the motor 68 and causes the pick-up roller 122 to move down to the sheet feeding position. The CPU 61 drives the clutch 69 and starts rotating the pair of registration rollers 124 at a timing T1 after a lapse of time required in order to bend a paper document only by a predetermined amount of resist from an input timing TS of a detection signal from the document sensor 151. The CPU 61 stops the rotation of the pair of feed rollers 123 at a timing T2 after a lapse of time for pressing the leading edge of a paper document into a nip between the pair of registration rollers 124 only by a length of 5 mm, for example, from a timing of start of rotation of the pair of registration rollers 124. The CPU 61 starts driving the motor 68 for feeding the following paper document (the second paper document) at a timing T4 when the back end of a preceding paper document passes the document sensor 151.

In the paper document mode, the CPU 61 causes the pick-up roller 122 to move down to the sheet feeding position until the leading edge of the last paper document (the 2nd sheet in this example) placed in the document placing tray 121 is detected by the document sensor 151. The upstream side of the paper document during being fed is successively pressed by the pick-up roller 122. Therefore, even though the rotation of the pair of feed rollers 123 stops between the timing T2 and the timing T4, the once-fed paper document does not move back to the document placing tray 121.

In feeding a low flexible card document in the card document mode which successively feeds a plurality of card documents (two sheets in FIG. 8), the CPU 61 starts driving the motor 68 and causes the pick-up roller 122 to move down to the sheet feeding position. The drive timing of the clutch 69 by the CPU 61 is the same as that in the paper document mode. The CPU 61 drives the clutch 69 and starts rotating the pair of registration rollers 124 at the timing T1 after a lapse of time required in order to press a card document into a nip of the pair of registration rollers 124 only by a predetermined length from an input timing TS of a detection signal from the document sensor 151. The CPU 61 also causes the pick-up roller 122 to move up to the standby position at the timing TS. The CPU 61 stops the rotation of the pair of feed rollers 123 at a timing T3 after a lapse of time for pressing the leading edge of a card document into a nip of the pair of registration rollers 124 only by a length of 50 mm, for example, from a timing of start of rotation of the pair of registration rollers 124. The CPU 61 starts driving the motor 68 for feeding the following card document (the second card document) at the timing T4 when the back end of a preceding card document passes the document sensor 151.

In the card document mode, the CPU 61 causes the pick-up roller 122 to move up to the standby position every time when the leading edge of each card document placed in the document placing tray 121 is detected by the document sensor 151. A card document during being fed is not pressed by the pick-up roller 122. Therefore, a sufficiently long time is provided by the timing T4 to prevent the once-fed card document from moving back to the document placing tray 121, the timing T3 being a time when the rotation of the feed rollers 123 stops.

Figures 9A, 9B:
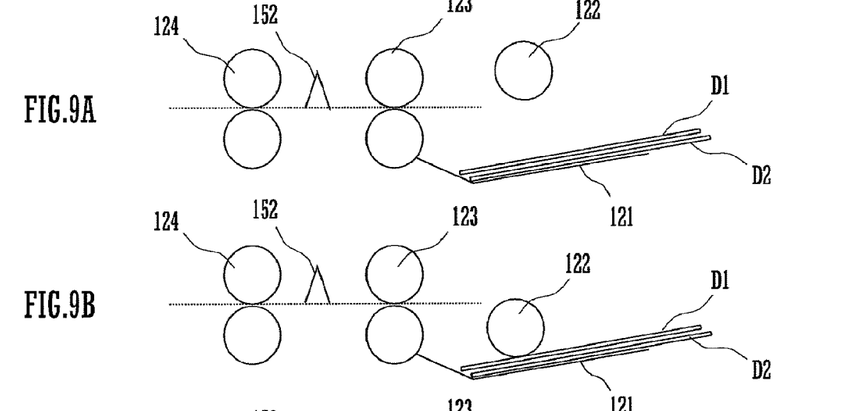
FIGS. 9A to 9F are figures illustrating a state of feeding a card document in the document feeder.

As shown in FIGS. 9A to 9F, a plurality (two sheets) of card documents D1 and D2 are fed by control in the card document mode by the CPU 61. More specifically, as shown in FIG. 9A, the pick-up roller 122 waits for the card documents D1 and D2 to be placed on the document placing tray 121 in a state where the pick-up roller 122 is located in the standby position.

Figure 9C:
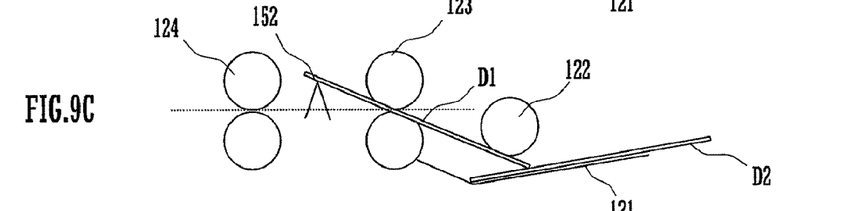
Figure 9D:
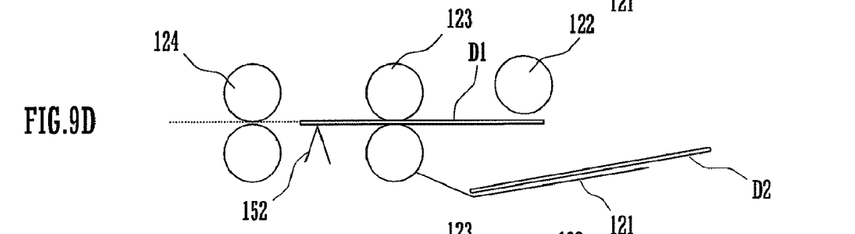

As shown in FIG. 9C, contacting with the leading edge of the card document D1 with the actuator 152 causes the pick-up roller 122 to move up to the standby position. Thereby, the pressing force of the pick-up roller 122 stops acting on the downstream portion of the card document D1, and the leading edge of the card document D1, as shown in FIG. 9D, moves down to the nip position of the pair of registration rollers 124. The fed position of the card document D1 is surely corrected by contact with the pair of registration rollers 124 which have not started rotation, so that the leading edge of the card document D1 can be surely guided to the nip of the pair of registration rollers 124 which start rotation.

Figure 9E:
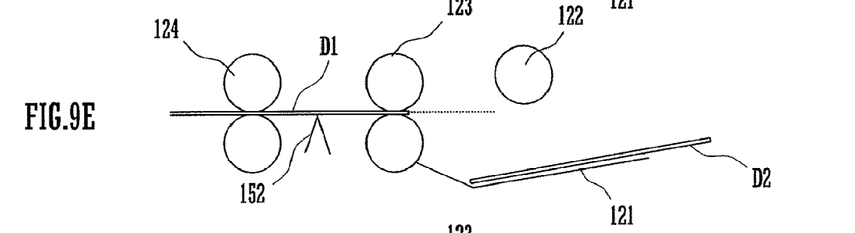
Figure 9F:
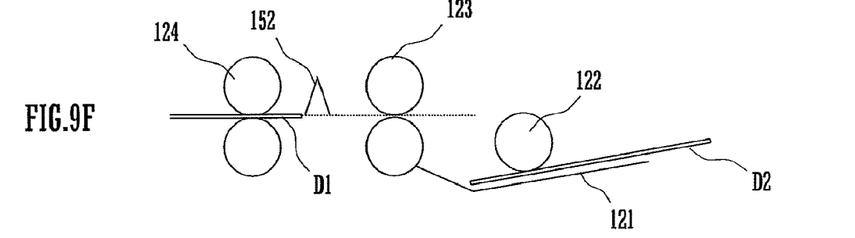

Then, as shown in FIG. 9E, when the leading edge of the card document D1 passes the nip of the pair of registration rollers 124 about 50 mm, the rotation of the pair of feed rollers 123 and the pick-up roller 122 stops. When the back end of the card document D1 is detected by the document sensor 151, as shown in FIG. 9F, the rotation of the pair of feed rollers 123 and the pick-up roller 122 starts, and causes the pick-up roller 122 to move down to the sheet feeding position to feed the following card document D2.

It is to be noted that the rotation of the pair of registration rollers 124 stops during time until the leading edge of the card document D2 reaches the pair of registration rollers 124 after the back end of the card document D1 passes the pair of registration rollers 124. This is in order to correct the fed position of the card document D2 by contacting with the leading edge of the card document D2 with the pair of registration rollers 124 during stop.

As shown in FIG. 9A and the like, the standby position of the pick-up roller 122 is a position where the lower end of the pick-up roller 122 is located above a line which connects the nip portion of the pair of feed rollers 123 and the nip portion of the pair of registration rollers 124. This is because the leading edge of the card document cannot face the nip of the pair of registration rollers 124 when the pick-up roller 122 contacts with the end portion on the downstream side of the card document.

In addition, as shown in FIG. 9C, a distance from a contact position with the card document in the sheet feeding position of the pick-up roller 122 to the position of the actuator 152 of the document sensor 151 is set shorter than the length of the card document. This is in order to surely detect by the document sensor 151 the leading edge of the card document fed by the pick-up roller 122.

In the control shown in FIG. 8, even after the document sensor 151 detects the leading edge of the card document, the rotation of the pair of feed rollers 123 continues, and the card document moves toward the pair of registration rollers 124. Therefore, when the moving-up speed of the pick-up roller 122 is not high enough as compared with the feeding speed of the card document by the pair of feed rollers 123, there is a possibility that the pick-up roller 122 may not separate from the back end portion of the card document before the leading edge of the card document reaches the pair of registration rollers 124. In this state, the leading edge of the card document reaches the pair of registration rollers 124 before facing the nip portion of the pair of registration rollers 124. Due to this state, the leading edge of the card document cannot be guided to the nip of the pair of registration rollers 124.

Figure 10:
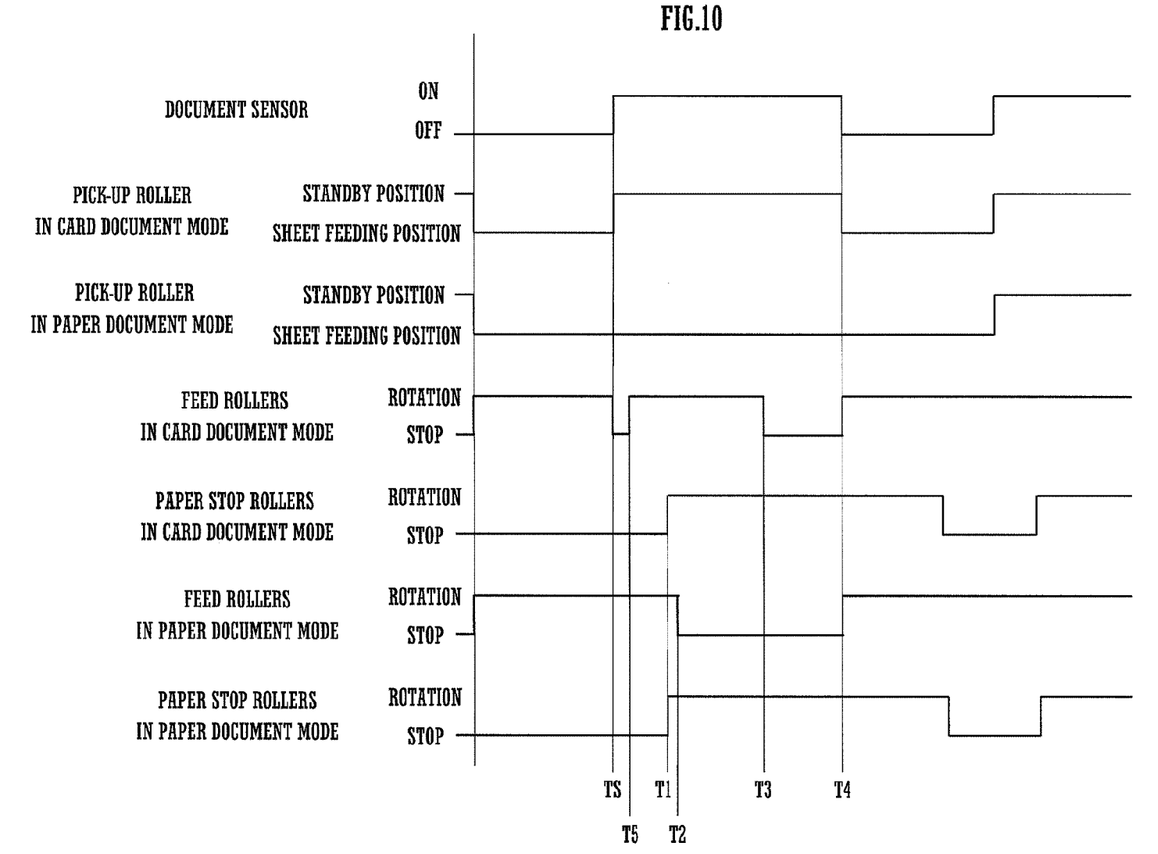
FIG. 10 is a timing chart of an operating state of each component by another control of the control portion.

As a solution to the problem, as shown in FIG. 10, the rotation of the feed rollers 123 stops from time when the document sensor 151 detects the leading edge of the card document to a timing T5 when a predetermined time elapses. This predetermined time is determined in consideration of the time required for the pick-up roller 122 to move from the sheet feeding position up to the standby position.

The above embodiments have been described with an image forming apparatus provided with a document feeder of the present invention. The document feeder of the present invention, however, can also be provided with a document reader without an image forming portion.

The above described embodiments are to be considered in all respects as illustrative and not restrictive.

The scope of the present invention is defined not by above described embodiments but by the claims. Furthermore, the scope of the present invention is intended to include all modifications that come within the meaning and scope of the claims and any equivalents thereof.

What is claimed is:

1. A document feeder comprising:
    a document placing portion having a placement surface where a document is placed thereon;
    a pick-up roller that is adapted to move up and down between a sheet feeding position in which the pick-up roller contacts with an upper surface of the document placed on the placement surface and a standby position in which the pick-up roller does not contact with the upper surface of the document placed on the placement surface;
    a pair of feed rollers and a pair of registration rollers that are disposed at a downstream side of the pick-up roller in a document feed direction;
    a document sensor that detects a document between the pair of feed rollers and the pair of registration rollers;
    a moving mechanism that causes the pick-up roller to move up and down;
    an operating portion that receives an operation of selecting a card document mode in which a plurality of card documents are successively fed with a predetermined interval between the card documents and a mode other than the card document mode; and
    a control portion that controls the moving mechanism, after the pick-up roller feeds a card document in a state in which the pick-up rollers is in the sheet feeding position when the card document mode is selected in the operating portion, to cause the pick-up roller to move up to the standby position at any time the document sensor detects a card document and to move down to the sheet feeding position when the document sensor detects no card document.

2. The document feeder according to claim 1, further comprising:
    a document size sensor that detects a size of a document placed on the placement surface,
    wherein the control portion performs the card document mode when the document size sensor detects a card size.

3. The document feeder according to claim 1, further comprising:
    a document size sensor that detects a size of a document placed on the placement surface, wherein the control portion performs the card document mode when the document size sensor detects a card size.

4. The document feeder according to claim 1, wherein the standby position is located above a line that connects a nip portion of the pair of feed rollers and a nip portion of the pair of registration rollers.

5. The document feeder according to claim 1, wherein the moving mechanism includes a motor different from a motor that supplies rotation to the pick-up roller.

6. The document feeder according to claim 1, wherein the control portion, when the card document mode is selected in the operating portion, controls a time from when the document sensor detects the card document to when the pair of feed rollers stops rotation so that the time in the card document mode is longer than the time in the mode other than the card document mode.

7. The document feeder according to claim 1, wherein the control portion temporarily stops rotation of the feed rollers for a predetermined period of time when the document sensor detects a card document.

8. An image reader comprising:
the document feeder according to claim 1; and
an image reading portion that is disposed on a downstream side of the pair of registration rollers in the document feed direction and that reads image data of the document fed by the document feeder.

9. An image forming apparatus comprising:
the image reader according to claim 8; and
an image forming portion that forms an image based on image data that the image reading portion reads from the document.

10. The document feeder according to claim 1, wherein a distance from a contact position of the pick-up roller in the sheet feeding position with the card document and to a position of the document sensor is shorter than a length of the card document in the document feed direction.

* * * * *